Jan. 13, 1948.   J. A. OLIVIER ET AL.   2,434,332
CONVERTIBLE AUTOMOBILE TOP
Filed Jan. 15, 1946
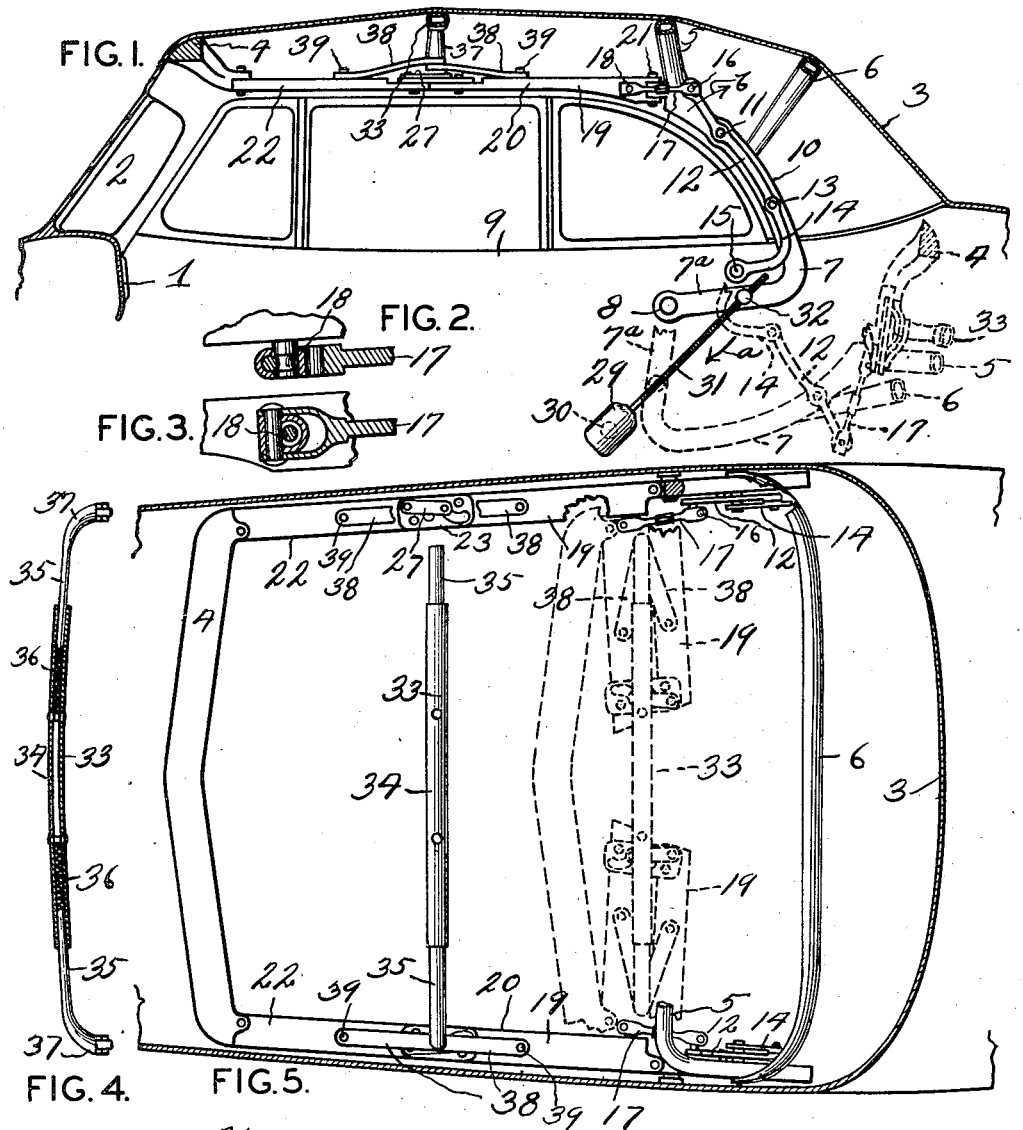
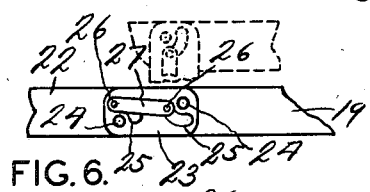
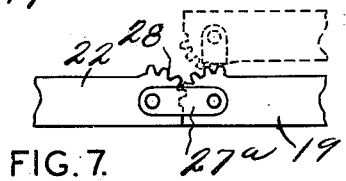
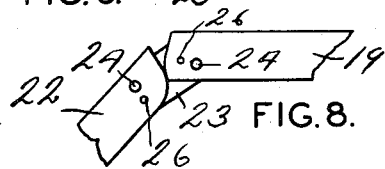
INVENTORS
Jules A. Olivier
BY Warren E. George
Philip A. H. Terrell Patented Jan. 13, 1948

2,434,332

UNITED STATES PATENT OFFICE 2,434,332

CONVERTIBLE AUTOMOBILE TOP

Jules A. Olivier, Grosse Pointe Farms, and Warren E. George, Detroit, Mich.

Application January 15, 1946, Serial No. 641,296

4 Claims. (Cl. 296—116)

1

The invention relates to automobile tops, and has for its object to provide a device of this kind wherein the various bows of the frame are carried by a collapsible frame, motor operated, and rearwardly collapsible for collapsing the entire frame and bows rearwardly and downwardly into a compact structure, and also extending the frame structure when desired.

A further object is to provide a collapsible frame work structure for an automobile top comprising hingedly connected side bars, a front bow, rear bows; the front bow being carried by the forward ends of the side bars and the rear bows by a lever pivoted to the car body and pivotally moved by a motor for extending or collapsing the frame. Also to provide a pivoted lever with a rock lever, one end of which has a link connection to a stationary pivoted member carried by the car body, and a link connection to the rear section of the side bar, for collapsing or extending the side bars.

A further object is to provide a link connection between the inner ends of the side bar sections whereby the forward bow, during the collapsing and extending of the frame, will be maintained parallel with the other bows.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through a conventional form of automobile body, showing the collapsible top in extended position, and in dotted line, collapsed position.

Figure 2 is a horizontal sectional view through a universal joint connection of one of the links.

Figure 3 is a view similar to Figure 2, taken at a right angle to that shown in Figure 2.

Figure 4 is a longitudinal sectional view through the yieldable extension bar.

Figure 5 is a top plan view of the frame in extended position, showing the side bars collapsed, in dotted lines.

Figure 6 is a top plan view of one of the side bar joints.

Figure 7 shows a modified form of side bar joint.

Figure 8 is a top plan view of one of the side bar joints, showing the sections at angles to each other.

2

Referring to the drawing, the numeral 1 designates the upper portion of a body of a conventional form of automobile, and 2 the windshield of the automobile. The top is of the flexible type as shown at 3, and is provided with a collapsible frame so that the fabric top, along with the frame, may be rearwardly collapsed to the dotted line position shown in Figure 2. The collapsible frame comprises a forward bow 4 and rearward bows 5 and 6, rigidly carried by the angularly shaped lever 7. The arm 7ª of the lever 7 is hingedly mounted at a fixed point 8 to the side 9 of the body, and the arm 10 of lever 7 extended arcuately upwardly and forwardly, has hingedly mounted at 11 a rock lever 12. One end of the rock lever 12 is hingedly connected at 13 to an angularly shaped link 14, one arm of which is hingedly connected at 15, at a fixed point to the side 9 of the body. It is to be understood that the mechanism is duplicated on both sides of the body.

Rock lever 12 is provided with a universal connection 16 to a link 17, and which link is provided with a universal connection 18 to the hinged section 19 of the side bar 20. Side bar section 19 has a horizontal hinge connection 21 to the upper end of the arcuate arm 10 of control lever 7, and during the collapsing operation is adapted to hingedly move each section 19 at opposite sides of the frame inwardly to the dotted line position shown in Figure 5. Each bar 20 comprises hingedly connected sections 19 and 22, connected together as shown in Figures 6 and 8 by plates 23, having pivoted connections 24 to the adjacent ends of bar sections 19 and 22. Plates 23 are provided with arcuate slots 25 in reverse relation to each other, and through which slots the pivot pins 26 carried by the adjacent ends of sections 19 and 22, extend, and which pins are connected together by links 27. An alternative structure may be used wherein the sections 19 and 22 have a gear interengagement at 28, and the sections are connected together by a link 27ª. Both of these structures are designed to maintain the forward bow 4 in parallel relation to bows 5 and 6 during the extending or collapsing operation.

The collapsing and extending of the frame is controlled by a motor 29, which motor is pivotally mounted at 30 to one or both sides of the car body. The motor 29 is provided with a threaded rotatable shaft 31, threaded through a rotatable lug 32 carried by the arm 7ª of the lever 7. Assuming the frame is extended, as shown in Figure 2, the motor is started, and the lever 7 swings downwardly in the direction of the arrow a. As the pivotal point 11 of rock lever 12 is carried by the operating lever 7 a downward and rearward movement is imparted in the direction of the arrow b on the upper end of the rock lever, and this action will impart a rearward pull on the link 17 which will swing inwardly the sections 19 of the side bars 20, passing through the dotted line position shown in Figure 5 and moving the front bow 4 rearwardly, maintaining parallel relation of the bows until the entire frame is collapsed to the dotted line position shown in Figure 1. A reverse operation of the motors will extend the frame to the full line position shown in Figure 1.

To maintain a spring pressure on the frame structure during the collapsing and extending operation, and for maintaining the device extended, a cross bar is provided. This cross bar 33 comprises a central sleeve 34 in the ends of which sleeve the rods 35 are slidably mounted against the action of expansion springs 36. The outer ends of rods 35 terminate in downwardly curved portions 37, which portions have link connections 38, at 39, to the side bar sections 19 and 22. It will be seen that when the side bar sections are pulled inwardly towards each other and rearwardly the pivotal points 39 will move inwardly and will eventually slide the rods 35 inwardly in the ends of the sleeve 34, compressing springs 36. This is clearly shown in the dotted line position of Figure 5, hence it will be seen that the device is tensioned, and that when the frame is extended the expansive action of springs 36 will force the side bar sections 19 and 22 to alined position as shown in Figure 5.

From the above it will be seen that a collapsible frame is provided for motor vehicle tops which is simple in construction, positive in its operation, and one which is motor operated.

The invention having been set forth what is claimed as new and useful is:

1. A collapsible vehicle top frame comprising a forward bar, rear bows, a pivoted operating lever carrying said rear bows, side bars connecting the lever and the forward bar, said side bars being formed from hingedly connected sections, inwardly collapsible, a rock lever carried by the first mentioned levers, a link connection between the rock levers and stationary points, the rear ends of the side bars being horizontally hinged to the first mentioned levers, link connections between the rock levers and the side bars adjacent their rear hinged points and forming means whereby the sectional side bars will be collapsed inwardly and moved rearwardly upon pivotal movement of the first mentioned levers.

2. A device as set forth in claim 1 wherein the link connections between the rock levers and the side bars have universal connections to the rock lever and to the side bars.

3. A device as set forth in claim 1 wherein the side bars are formed from two sections, link connections between adjacent ends of the sections, said link connections having guiding means formed as a part thereof for uniformly guiding the sections inwardly and outwardly during the collapsing or extending operation.

4. A device as set forth in claim 1 including a transverse tensioning bar, said tensioning bar comprising a sleeve, expansion springs in the ends of said sleeve, rods slidably mounted in the ends of the sleeve and engaging the springs, the outer ends of said rods having link connections with the inner ends of the sections of the side bars at opposite sides of the hinged connection between the sections of the side bars.

JULES A. OLIVIER.
WARREN E. GEORGE.

REFERENCES CITED

The following references are of record in the file of this patent:

UNITED STATES PATENTS

| Number | Name | Date |
| --- | --- | --- |
| 2,279,541 | Westrope | Apr. 14, 1942 |

FOREIGN PATENTS

| Number | Country | Date |
| --- | --- | --- |
| 448,720 | Great Britain | June 15, 1936 |